Dec. 22, 1964 J. A. ENGLERT ETAL 3,162,455
REMOVABLE STUFFING BOX T-BOLT LUG ARRANGEMENT FOR VALVES
Filed June 7, 1963 3 Sheets-Sheet 1

Inventors.
Joseph A. Englert,
John P. Magos, &
Kurt B. Bredtschneider.
By Joseph O. Lange
Atty.

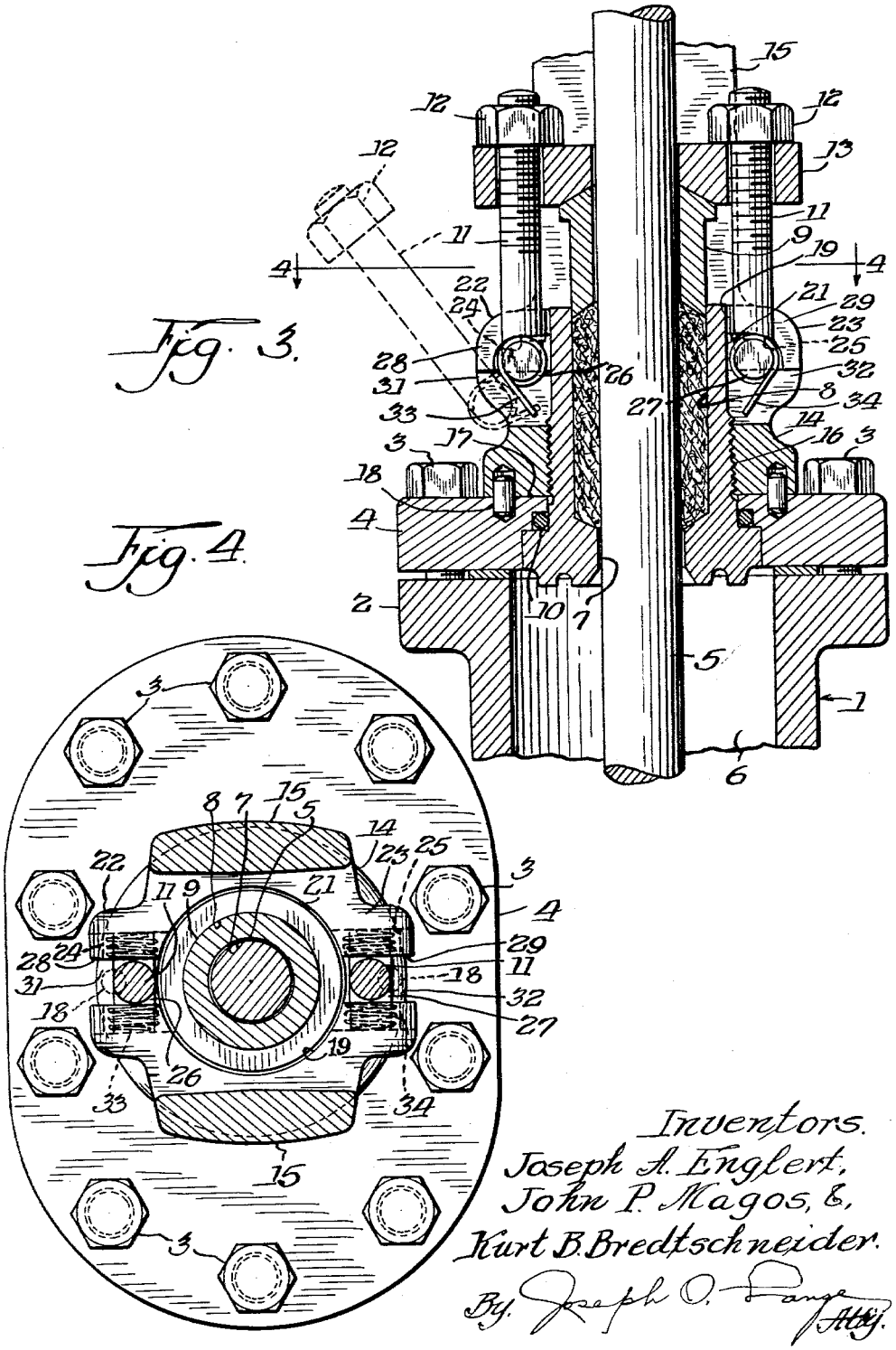

Dec. 22, 1964  J. A. ENGLERT ETAL  3,162,455
REMOVABLE STUFFING BOX T-BOLT LUG ARRANGEMENT FOR VALVES
Filed June 7, 1963  3 Sheets-Sheet 3

Inventors,
Joseph A. Englert,
John P. Magos, &
Kurt B. Bredtschneider.
By Joseph O. Lange
Atty.

United States Patent Office 3,162,455
Patented Dec. 22, 1964

3,162,455
REMOVABLE STUFFING BOX T-BOLT LUG
ARRANGEMENT FOR VALVES
Joseph A. Englert, Chicago, John P. Mages, Wilmette, and Kurt E. Bredtschneider, Chicago, Ill., assignors to Crane Co., Chicago, Ill., a corporation of Illinois
Filed June 7, 1963, Ser. No. 286,303
8 Claims. (Cl. 277—105)

This invention relates generally to a novel stuffing box construction with a gland bolt mounting therefor, and, more particularly, it is concerned with the type of construction suitable not only for valves, but also for other types of pressure vessels, such as pumps, or the like, in which a reciprocating or rotating or a combined reciprocating-rotating shaft is employed in a leakproof mounting or bearing.

At the outset, in order to have a better appreciation of the inventive concept involved here, it should be understood that in the compressing of the packing in a stuffing box, frequently the packing is tightened by means of packing-gland nuts or a gland flange employing stud bolts or eye bolts to compress the said packing. The objection to such designs, particularly where gland nuts are employed, is the expense in repairing a damaged stuffing box, and further, the excessively high torque required, necessitating the use of large wrenches. The latter are necessarily difficult to handle, because generally speaking, the space between the yoke arms is relatively restricted.

A further objection to the use of the more easily retained eye bolt designs lies in the fact that the ears for the eye bolts usually positioned on the bonnet or on the yoke are difficult to cast and the drilling for eye bolt pins necessitates an extra machining operation involving the use of costly drilling fixtures.

A further objection to the prior constructions lies in the fact that the conventional eye bolt designs previously employed do not permit of mounting the gland bolts sufficiently close to the stem central axis and thus to keep the bending moment on the bonnet flange to a minimum, as well as maintaining flange dimensions to a desirable minimum proportion.

A further objection to prior constructions lies in the fact that the eye bolt pins in the course of service frequently become loosened and the gland bolts are then lost or dropped into inaccessible areas during the packing of the stuffing box. Accordingly, it is an important object of this invention to provide a gland and stuffing box construction in which inverted T-bolts employed therefor are beneficially positioned so as to be incapable of becoming loosened and lost.

A further object is to provide for a gland T-bolt mounting in which the T-bolt is securely received within a cavity provided by spaced-apart lugs on the yoke member between the yoke arms.

Another benefit resulting in greater compactness in the positioning of the gland T-bolts provides for a yoke construction in which the T-bolts are positioned immediately adjacent the wall defining the stuffing box whereby to obtain the compactness referred to.

Another object is to provide for a gland T-bolt construction in which the yoke can be joined to the bonnet either by thread means or a split clamp construction to enable desirable compactness of the gland bolt assembly.

A further object is to provide for a gland T-bolt construction in which the T-bolts cannot be removed except upon disassembly of the yoke from the stuffing box or by special manipulation of the said gland bolts.

Another object of this invention is to provide for a construction in which by removal of the stuffing box the removal and assembly of the gland T-bolts is facilitated.

Another object is to provide for resiliently supported gland T-bolts whereby said bolts are held in place against loss and are easily removed upon predetermined compression of said resilient supports.

Other objects and advantages will become more readily apparent upon proceeding with the following description read in light of the accompanying drawings, in which:

FIG. 3 is a fragmentary sectional view of a modified form of the invention;

FIG. 4 is a sectional assembly view taken on the line 4—4 of FIG. 3;

Similar reference numerals refer to similar parts throughout the several views.

Figure 1:
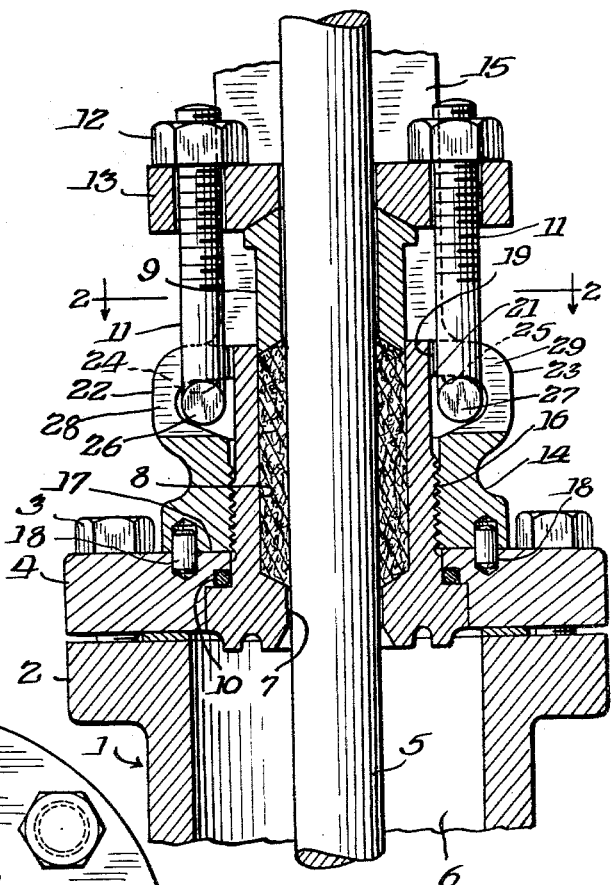
FIG. 1 is a fragmentary sectional assembly view of a preferred embodiment of our invention.

Referring now to FIG. 1, the end portion of a pressure vessel generally designated 1, such as a valve body, for example, is provided with a connecting bonnet flange 2, joined by means of a plurality of bolts 3 to a bonnet or cover 4. A valve stem or a pump shaft as the case may be is indicated at 5 and projects from the chamber 6 through the bonnet 4 as at aperture 7, the latter opening communicating with a stuffing box 8 within which the gland 9 enters in the usual manner of a stuffing box gland to compress the packing therewithin. In this construction, the stuffing box 8 is a separate part as distinguished from the bonnet being attached to the bonnet member by means of the yoke. For purpose of compressing the said packing the oppositely disposed T-bolts 11 are employed having the usual tightening nuts 12 bearing directly against the gland flange 13 and through the latter member against the gland 9 in the manner illustrated.

Figure 2:
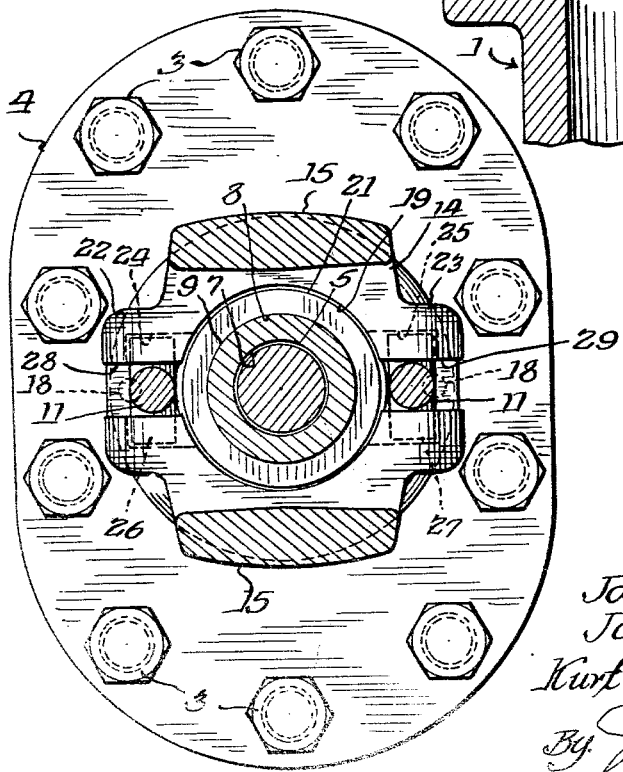
FIG. 2 is a fragmentary sectional view taken on the line 2—2 of FIG. 1.

A yoke member 14 having the usual oppositely disposed arms 15 as shown more clearly in FIG. 2 is joined to the bonnet 4 by means of the threads 16 to draw up the yoke member 14 against the annular surface 17, the yoke 14 being held against rotation by means of the interposed oppositely positioned pins 18. It will be noted that the stuffing box portion immediately above the threads 16 projects through the aperture 19, the stuffing box having the plain shank 21 projecting therethrough. As more clearly shown in FIG. 2, the yoke 14 is preferably provided between the arms 15 with the oppositely disposed hollow lugs 22 and 23, the latter members being recessed as at 24 and 25 respectively to receive the T-heads 26 and 27 of the gland bolts 11. It will be appreciated that the positioning of the gland bolts 11 with their respective T-heads in the recesses designated 24 and 25 takes place before the occurrence of the actual threaded assembly of the yoke 14 with the stuffing box 8 and the clamping of the bonnet 4 therebetween. The assembly between the stuffing box and the bonnet is preferably fluid sealed by means of an O-ring 10. Thus, when it becomes necessary to repack the stuffing box upon removal of the gland nuts 12 and the gland flange 13, the gland bolts 11 can be swivelably moved outwardly away from the stuffing box through the respective spaces provided at 28 and 29. The embodiment hereinabove described represents a construction in which the stuffing box 8 serves as the means by which the yoke member is attached to the bonnet and is firmly held against rotation. At the same time, the yoke member closely encompasses the stuffing box and permits of the application of the gland bolts in a compact manner. The described assembly thus permits of retaining the gland bolts without danger of loss or displacement.

Referring now to a further modified construction, it will be appreciated that by suitable modification of the retaining hollow lugs 22 and 23 upon the yoke 14, provision may be made to swing the gland bolts 11 outwardly and without the necessity for removing or disassembling the stuffing box 8 from the yoke 14. In this modification, as shown more clearly in FIGS. 3 and 4, the hollow lugs 22 and 23 are provided with a lower extension of the recesses 24 and 25 as indicated at 31 and 32 respectively. In this modified construction, the T-heads 26 and 27 of the gland bolts 11 are provided with the coil springs 33 and 34 mounted thereover and with the outwardly bent ends of said springs arranged as indicated on each side of the inverted head section of the T-bolt, thereby keeping the T-bolts from dropping out through the respective lug extension openings 31 and 32. It will be appreciated of course that upon loosening and removing the gland nuts 12 and the gland flange 13, the gland bolts can be removed by merely moving them downwardly and axially in a direction toward the respective lug openings 31 and 32 against the resistance offered resiliently by the outwardly extending straight end limits of the said springs. It will be appreciated that the said T-bolts together with the said springs are thus easily removed through the respective openings 31 and 32 as indicated more clearly in the dotted lines shown in FIG. 3. It will be further understood that in the normal position of the gland bolts 11 as shown in the solid lines of FIG. 3, the depending straight ends of the respective springs 33 and 34 will prevent the dropping out of the gland bolts by contacting the bottom of the respective spaces 31 and 32.

The benefit in the above construction over that previously described is that it is unnecessary to remove the stuffing box assembly from the yoke because the gland bolts in this modification are readily removable from the outside through the openings 31 and 32.

It will of course be appreciated that the form of the resilient means 33 and 34 may vary substantially and the positioning in relation to the T-bolts can be changed to an end position while increasing the space between the lugs so that by merely turning the T-bolt biased against the resilient means permits of the convenient removal of the T-bolts exteriorly of the lugs 22 and 23.

Figure 5:
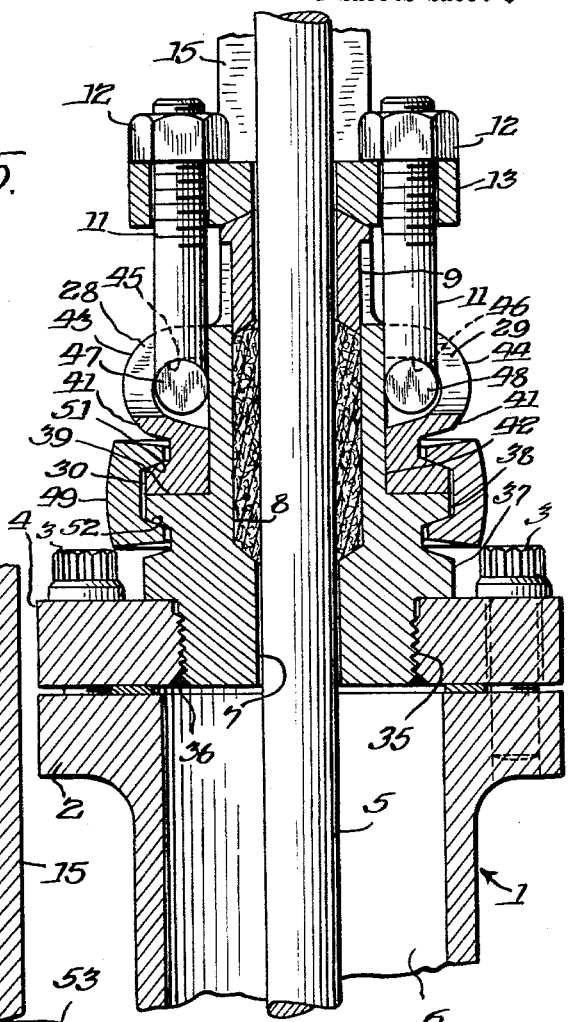
FIG. 5 is a further modified form of the invention.
Figure 6:
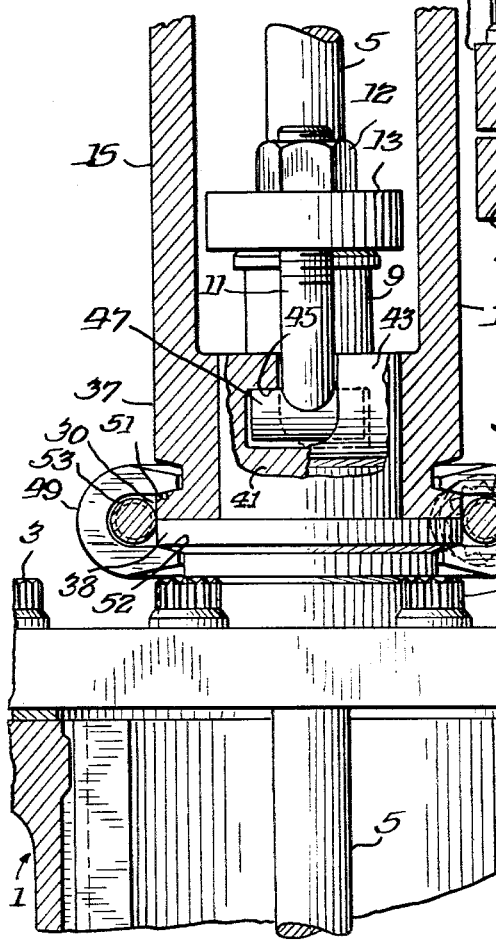
FIG. 6 is a fragmentary transverse sectional assembly view taken transversely of the vertical axis of the valve portion shown in FIG. 5.

Referring now to a further modification shown in FIGS. 5 and 6, in this construction it will be noted that the stuffing box 8 is provided with a threaded shank 35 threadedly engaging the bonnet 4 and is sealed as at 36 by a usual annular weld. Actually, in this construction, the stuffing box 8 is integral with the yoke which consists of the oppositely disposed yoke arms 15, which integral assembly is now designated herein as 37. The combined stuffing box and yoke 37 is provided with the annular flange 38 over which in superposed abutting relation and supported upon the annular surface 39, the gland bolt supporting member 41 is relatively closely fitted around the plain shank portion 42 of the combined yoke and stuffing box as illustrated. On an upper or outer portion of the gland bolt supporting member 41, a pair of oppositely disposed hollow lugs preferably integral therewith designated 43 and 44 are provided. The latter members are hollow as at 45 and 46 to receive the gland bolts 11 having the T-head portions 47 and 48 respectively. In this modification, a split clamp construction is employed to hold the gland bolt supporting member 41 firmly to the combined stuffing box and yoke member 37 as evidenced by the clamp which consists of a pair of half portions designated 49 (only one of which is shown) and having the respective oppositely disposed annular inclined surfaces 51 and 52 thereon respectively engaging the flange portions 30 and 38 whereupon drawing the clamp bolts 53 together the said connection is completed. In this construction, it will be noted that the gland bolts 11 can only be inserted within the respective hollow recesses 45 and 46 before the plain shank portion 42 of the stuffing box has entered the apertured gland bolt supporting member 41. Of course, in the same manner as previously described, the gland bolts can be tilted outwardly into the respective spaces 28 and 29 to allow for the repacking or replacement as desired upon removal of the gland nuts 12 and the gland flange 13. This construction possesses the advantage that a relatively compact mounting of the gland bolts close to the peripheral limits of the stuffing box is obtained, while at the same time allowing for a simple clamp connection between the gland bolt supporting members and the combined stuffing box and yoke member. In all other respects, the construction follows the general principle of the invention embodied in the previously described figures so that it is deemed unnecessary to repeat the description with respect to such parts and assembly.

While a plurality of embodiments has been shown and described, it will be appreciated that these embodiments are only for purpose of illustration and the invention therefore should be measured by the scope of the appended claims.

We claim:

1. In a valve construction or the like for cooperation with an actuating stem, the combination including a bonnet member therefor, a separable combined yoke and stuffing box means, the yoke having spaced apart arms for journalling the said stem at its upper limit, gland and gland T-bolt means for the said stuffing box means for compressing the packing in the stuffing box means, supporting means for said gland T-bolt means, threaded retaining means cooperating with said bonnet member and yoke for joining the said yoke and stuffing box to the said bonnet member, hollow spaced apart lug means engaging said gland T-bolt means cooperating with said threaded retaining means, the said stuffing box means having an outer wall portion to prevent removal of said gland bolt means inwardly of said lug means upon completion of the assembly of the stuffing box and yoke means with said bonnet.

2. The subject matter of claim 1, the outside diameter of said stuffing box being defined by a space measured by the inner edges of the said gland T-bolt means.

3. The subject matter of claim 1, resilient means cooperating with said lug means and said gland T-bolt means to permit upon predetermined movement of said gland T-bolt means biased against said resilient means the removal of said gland T-bolt means exteriorly of said lug means.

4. The subject matter of claim 3, the said resilient means being coiled springs wound about the said gland T-bolt means.

5. The subject matter of claim 4, the said coiled springs having outwardly bent ends normally engaging lower surface portions of said lug means to resiliently support said gland T-bolts.

6. The subject matter of claim 1, the said combined stuffing box and yoke means having annular means therebetween for effecting alignment of the said yoke with the said stuffing box.

7. In a valve construction or the like for cooperation with an actuating stem, the combination including a bonnet member therefor, a separable combined yoke and stuffing box means, the yoke having spaced apart arms for journalling the said stem at its upper limit, gland and gland T-bolt means for the said stuffing box means for compressing the packing in the stuffing box means, supporting means for said gland T-bolt means comprising a threaded annular portion of said yoke means engaging said stuffing box means and bearing non-rotatably against said bonnet member, hollow spaced apart lug means on said threaded annular portion of said yoke means for engagement by said gland T-bolt means, the said lug means having recessed opening in a direction toward said stuffing box whereby the latter member cooperates with the said lug means to prevent removal of said gland bolts inwardly of said lug means upon completion of the assembly of the stuffing box and yoke means with said bonnet.

8. The subject matter of claim 6, split clamp means for joining said combined stuffing box and yoke means to said gland T-bolt supporting means.

References Cited in the file of this patent
UNITED STATES PATENTS

| | | |
|---|---|---|
| 1,866,292 | Carlson | July 5, 1932 |
| 2,563,012 | Dopp et al. | Aug. 7, 1951 |
| 2,722,401 | Tell et al. | Nov. 1, 1955 |